United States Patent
Dashevskiy

(10) Patent No.: US 9,909,406 B2
(45) Date of Patent: Mar. 6, 2018

(54) AUTOMATED DELIVERY OF WELLBORE CONSTRUCTION SERVICES

(71) Applicant: Dmitriy Dashevskiy, Nienhagen (DE)

(72) Inventor: Dmitriy Dashevskiy, Nienhagen (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 792 days.

(21) Appl. No.: 14/279,995

(22) Filed: May 16, 2014

(65) Prior Publication Data
US 2015/0330201 A1    Nov. 19, 2015

(51) Int. Cl.
| | | |
|---|---|---|
| G05B 21/00 | (2006.01) | |
| E21B 44/00 | (2006.01) | |
| G05B 15/02 | (2006.01) | |
| E21B 47/12 | (2012.01) | |

(52) U.S. Cl.
CPC ............ *E21B 44/00* (2013.01); *E21B 47/124* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 5,768,506 A | 6/1998 | Randell | |
| 5,826,020 A | 10/1998 | Randell | |
| 6,041,306 A | 3/2000 | Du et al. | |
| 6,190,224 B1 | 2/2001 | Byun et al. | |
| 6,721,615 B2 | 4/2004 | Fava et al. | |
| 7,283,914 B2 | 10/2007 | Poorman et al. | |
| 7,483,902 B2 | 1/2009 | Ghai et al. | |
| 7,571,225 B2 | 8/2009 | Devraj et al. | |
| 7,630,777 B2 | 12/2009 | Rudnick et al. | |
| 7,676,294 B2 | 3/2010 | Baier et al. | |
| 7,870,012 B2 | 1/2011 | Katz et al. | |
| 7,925,527 B1 * | 4/2011 | Flam ................ G06F 17/30398 |
| | | | 705/7.26 |
| 8,010,218 B2 | 8/2011 | McGreevy et al. | |
| 8,121,716 B2 | 2/2012 | Offenmuller | |
| 8,121,971 B2 * | 2/2012 | Edwards ................. E21B 44/00 |
| | | | 706/48 |
| 8,131,510 B2 * | 3/2012 | Wingky ................. E21B 44/00 |
| | | | 702/188 |
| 8,301,480 B2 | 10/2012 | Ramachandran | |
| 8,341,005 B2 | 12/2012 | Ramachandran | |

(Continued)

FOREIGN PATENT DOCUMENTS

WO    2012008847 A1    1/2012

OTHER PUBLICATIONS

International Search Report and Written Opinion for PCT Application No. PCT/US2015/031016, dated Aug. 3, 2015, pp. 1-10.

*Primary Examiner* — Philip Wang
(74) *Attorney, Agent, or Firm* — Cantor Colburn LLP

(57) ABSTRACT

A system and a method to providing a drilling service are described. The system includes a processor to identify two or more tasks associated with the service and one or more procedures associated with each of the one or more tasks. The system also includes an output interface to output commands to complete the one or more procedures associated with each of the two or more tasks, the commands being directed to actors that complete the one or more procedures, the actors including a downhole tool, a surface tool, or a human operator.

19 Claims, 5 Drawing Sheets

(56) References Cited

U.S. PATENT DOCUMENTS

| | | |
|---|---|---|
| 8,429,668 B2 | 4/2013 | Kowalkiewicz et al. |
| 8,443,351 B2 | 5/2013 | Haselden et al. |
| 8,452,562 B2 | 5/2013 | Desimas et al. |
| 8,516,016 B2 | 8/2013 | Park et al. |
| 8,533,608 B1 | 9/2013 | Tantiprasut |
| 2003/0141078 A1 | 7/2003 | MacKenzie |
| 2005/0209836 A1 | 9/2005 | Klumpen et al. |
| 2006/0095473 A1 | 5/2006 | Fox |
| 2006/0100797 A1 | 5/2006 | Poorman et al. |
| 2008/0015714 A1 | 1/2008 | Rudnick et al. |
| 2010/0100499 A1 | 4/2010 | Lele |
| 2011/0113008 A1 | 5/2011 | Jafri et al. |
| 2011/0272144 A1 | 11/2011 | Belcher et al. |
| 2012/0123756 A1 | 5/2012 | Wang et al. |
| 2012/0209655 A1 | 8/2012 | Ramachandran |
| 2012/0215502 A1 | 8/2012 | Mijares et al. |
| 2012/0227044 A1 | 9/2012 | Arumugham et al. |
| 2013/0104137 A1* | 4/2013 | Fukuzaki ............... G06F 9/4887 718/102 |
| 2013/0110274 A1 | 5/2013 | D'Mura et al. |
| 2013/0144678 A1 | 6/2013 | Ramachandran |
| 2013/0231787 A1* | 9/2013 | Chapman ............... E21B 44/00 700/282 |
| 2013/0253684 A1 | 9/2013 | Rudnick et al. |
| 2013/0263143 A1 | 10/2013 | Kiyoumi |
| 2013/0297369 A1 | 11/2013 | Shook |
| 2013/0311147 A1* | 11/2013 | Greenwood ........... G06Q 10/06 703/1 |
| 2014/0282257 A1* | 9/2014 | Nixon .................... G05B 11/01 715/835 |
| 2015/0134258 A1* | 5/2015 | Luppens ............... E21B 49/003 702/11 |

* cited by examiner

… (US 9,909,406 B2)

AUTOMATED DELIVERY OF WELLBORE CONSTRUCTION SERVICES

BACKGROUND

Downhole exploration and production efforts involve the deployment of a variety of sensors and tools. The sensors may provide information about the downhole environment, for example, by providing measurements of temperature, density, and resistivity, among many other parameters. Other tools may be at the surface, for example, such as top drive or pumps. This information may be used to control aspects of drilling and tools or systems located in the bottomhole assembly, along the drillstring, or on the surface.

SUMMARY

According to one embodiment of the invention, a system to provide a drilling service, the service corresponding with a goal, includes a processor configured to identify two or more tasks associated with the service and one or more procedures associated with each of the one or more tasks; and an output interface configured to output commands to complete the one or more procedures associated with each of the two or more tasks, the commands being directed to actors that complete the one or more procedures, the actors including a downhole tool, a surface tool, or a human operator.

According to another embodiment of the invention, a method of providing a drilling service, the service corresponding with a goal, includes identifying, using a processor, two or more tasks required to provide the service; identifying one or more procedures associated with completing each of the two or more tasks; and outputting commands to complete the one or more procedures associated with each of the two or more tasks, the commands being directed to actors that complete the one or more procedures, the actors including a downhole tool, a surface tool, or a human operator.

BRIEF DESCRIPTION OF THE DRAWINGS

Referring now to the drawings wherein like elements are numbered alike in the several Figures.

DETAILED DESCRIPTION

As noted above, an individual tool may be controlled using measurements from one or more sensors. This task-oriented control approach treats each of the downhole tools individually. A different approach which focuses on accomplishing a goal is described herein. According to this alternate approach, drilling activities (e.g., drilling, tripping, reaming, etc.) and informational activities are treated as services that are controlled based on an identified goal. Rather than a task-oriented control of a tool (e.g., use vibration and other sensor measurements to control drilling operation), service-oriented control is detailed herein, with a specific discussion of drilling services. Embodiments of the systems and methods described herein relate to providing a drilling service by controlling actors to complete the (downhole and surface) tasks involved in accomplishing the goal. Exemplary tasks include obtaining a sensor measurement or adjusting a drilling path.

Figure 1:
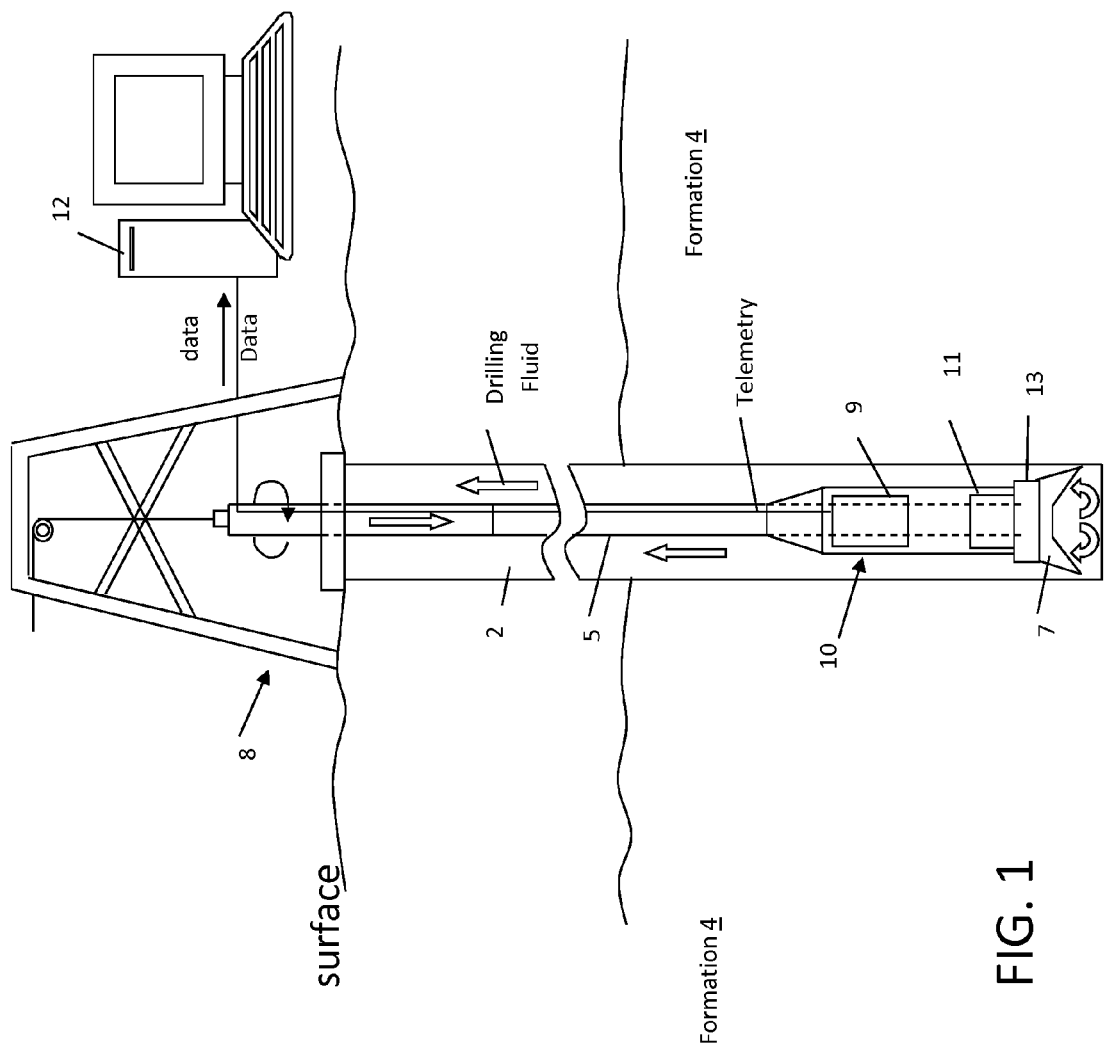
FIG. 1 is a cross-sectional view of a downhole system according to an embodiment of the invention.
Figure 2:
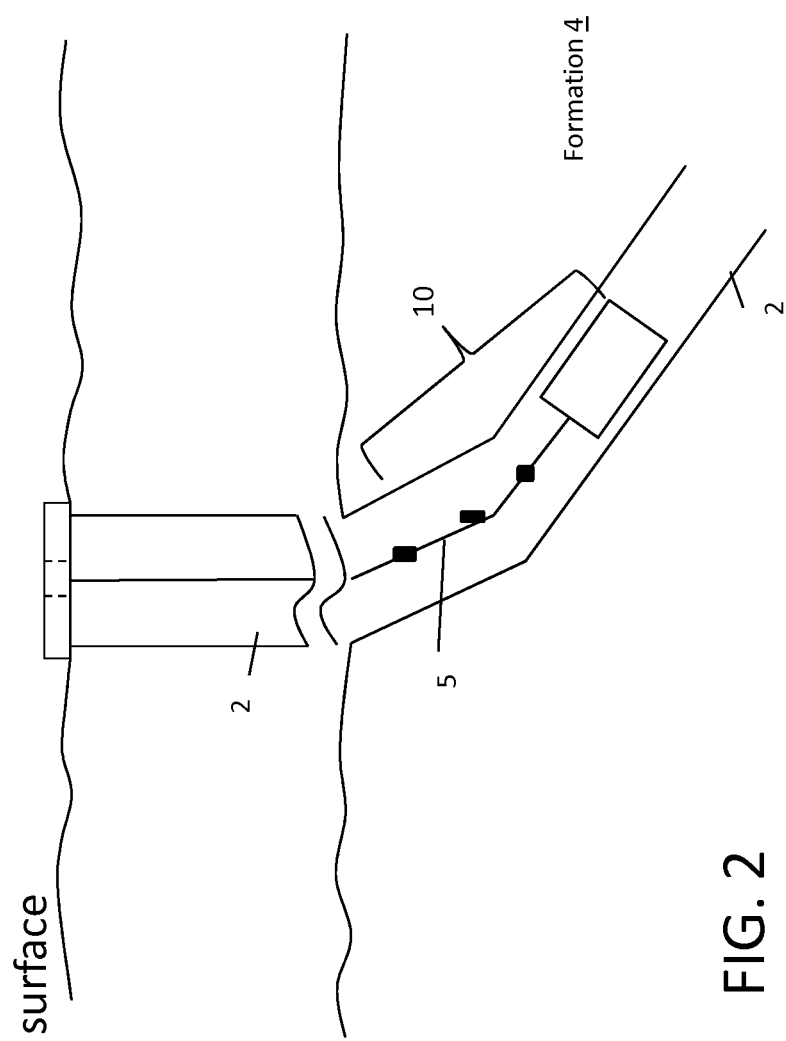
FIG. 2 is a cross-sectional view of a downhole system according to an embodiment of the invention.

FIG. 1 is a cross-sectional view of a downhole system according to an embodiment of the invention. The system and arrangement shown in FIG. 1 is one example to illustrate the downhole environment. While the system may operate in any subsurface environment, FIG. 1 shows downhole tools 10 disposed in a borehole 2 penetrating the earth 3. The downhole tools 10 are disposed in the borehole 2 at a distal end of a carrier 5, as shown in FIG. 1, or in communication with the borehole 2, as shown in FIG. 2. The downhole tools 10 may include measurement tools 11 and downhole electronics 9 configured to perform one or more types of measurements in an embodiment known as Logging-While-Drilling (LWD) or Measurement-While-Drilling (MWD). According to the LWD/MWD embodiment, the carrier 5 is a drill string that includes a bottomhole assembly (BHA) 13. The BHA 13 is a part of the drilling rig 8 that includes drill collars, stabilizers, reamers, and the like, and the drill bit 7. The measurements may include measurements related to drill string operation, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2. Raw data and/or information processed by the downhole electronics 9 may be telemetered to the surface for additional processing or display by a computing system 12. Drilling control signals may be generated by the computing system 12 and conveyed downhole or may be generated within the downhole electronics 9 or by a combination of the two according to embodiments of the invention. The downhole electronics 9 and the computing system 12 may each include one or more processors and one or more memory devices. In alternate embodiments, computing resources such as the downhole electronics 9, sensors, and other tools may be located along the carrier 5 rather than being located in the BHA 13, for example. The borehole 2 may be vertical as shown.

FIG. 2 is a cross-sectional view of a downhole system according to an embodiment of the invention. FIG. 2 illustrates two exemplary alternatives from FIG. 1. In an embodiment called directional drilling, the borehole 2 may not be vertical but, instead, may extend into a formation 4 at an angle, as shown, or a combination of angles to form a well path. Also, once drilling operations are completed, the carrier 5 may be, for example, an armored wireline cable in an embodiment known as wireline logging. The embodiment shown in FIG. 2 may involve some of the same downhole tools 10 shown in FIG. 1, as well as additional tools. Some exemplary downhole tools 10 include nuclear magnetic resonance (NMR) tools, vibration measurement tools, formation resistivity measurement devices, fiber Bragg gratings (FBGs) used in conjunction with a light source (e.g., laser), acoustic look-ahead tools, and seismic sensors.

Figure 3:
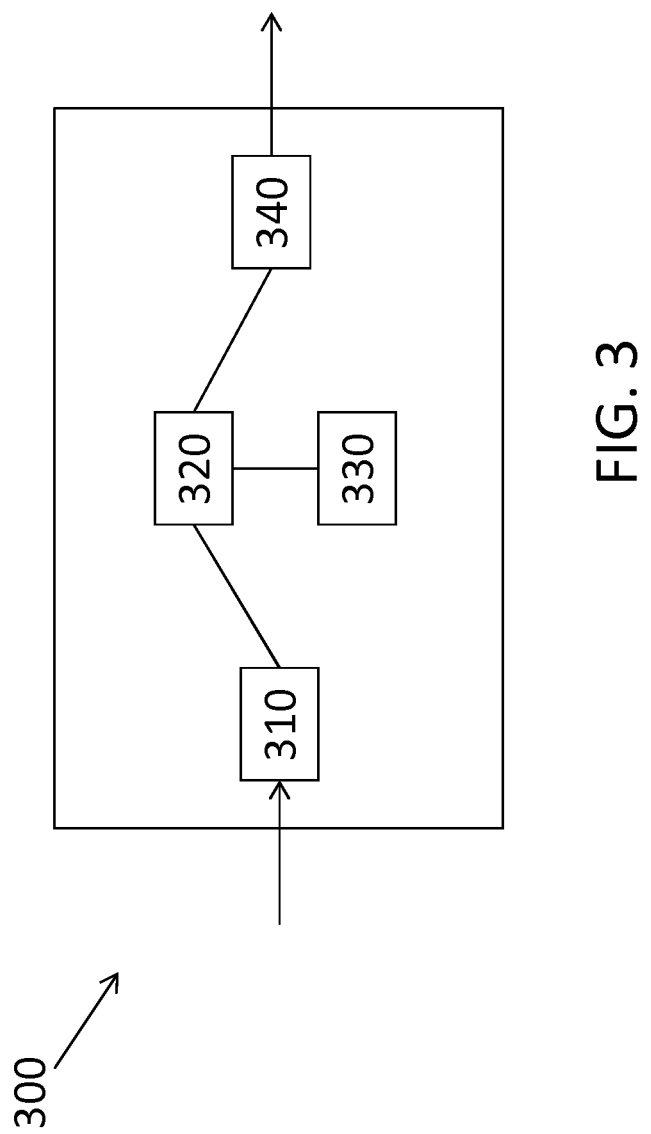
FIG. 3 is a block diagram of an exemplary supervisory control system 300 to provide a service according to embodiments of the invention.

FIG. 3 is a block diagram of an exemplary supervisory control system 300 to provide a service according to embodiments of the invention. The service may be interchangeably referred to as a process or process control. The service provided by the supervisory control system 300 may be the accomplishment of an action (e.g., directional drilling, as discussed below). The service provided by the supervisory control system 300 through the various tasks may instead be providing information. The information may be used to determine, for example, subsequent goals, the tasks needed to achieve goals, task priorities, or whether a previously planned task or procedure is possible under existing conditions. The supervisory control system 300 may be part of the downhole electronics 9, the computing system 12, or a combination of the two, and may, alternatively, be an independent system and may communicate with the downhole electronics 9 and the computing system 12. The supervisory control system 300 includes an input interface 310, one or more processors 320, one or more memory devices 330, and an output interface 340. The supervisory control system 300 receives information about the requested service as well as inputs (e.g., from the downhole tools 10, from surface sensors, from user input) at the input interface 310. Some or all of the input may be stored in the storage device 330. According to one embodiment, in which the service execution is rule-based, the processor 320 may access the storage device 330 to determine the tasks corresponding with the requested service and inputs (services repository 430 discussed with reference to FIG. 4). Determining the tasks required for a given process may be based, additionally or alternatively, on one or a combination of data (e.g., from the downhole tools 10) obtained in real time, planning and engineering data, and information about best practices. That is, tasks may be added or modified dynamically based on real time conditions and on stored information regarding the best response or mitigation to a particular condition.

For example, the requested service may be directional drilling with reference to the formations being drilled, known as geosteering. This service is associated with a goal of drilling with a trajectory that optimizes placement within a reservoir or geological zone of interest. The service may be provided in one of several modes, including: autonomous control, semi-autonomous or advisory and manual or monitoring. In the autonomous mode, the supervisory control system 300 reads the formation evaluation and directional sensors that are located within the drillstring and on surface, processes the data, and controls the actors (tools and personnel) needed to provide the service (execute the process control) and achieve the goal. In the semi-autonomous or advisory mode, the supervisory control system 300 may provide prompts or information (e.g, step-by-step instructions) to an operator who ultimately manages the tools and tasks. In the manual mode, the supervisory control system 300 provides information to an operator (e.g., at a display), and the operator controls the completion of the tasks to provide the service. In the exemplary case of the geosteering service, an autonomous mode is assumed for illustrative purposes. The supervisory control system 300 determines the tasks required by the process. For example, providing the geosteering service requires controlling several tasks of the drilling rig 8. These tasks include angling the BHA 13 to achieve the predefined trajectory, for example. When (as is often the case), a process is associated with more than one task, the tasks within the process must be prioritized. This is especially necessary because many of the tasks use the same actors (e.g., tools, activities, applications, personnel) to accomplish the task. The tools (components) that act as actors in accomplishing tasks may be referred to as artifacts. The steps within a task may be referred to as procedures, and the rules that define a condition to initiate a procedure of a task to accomplish a process (service) may be referred to as triggers. This exemplary nomenclature is used for explanatory purposes and is not intended to limit the embodiments described herein in any way.

Figure 4:
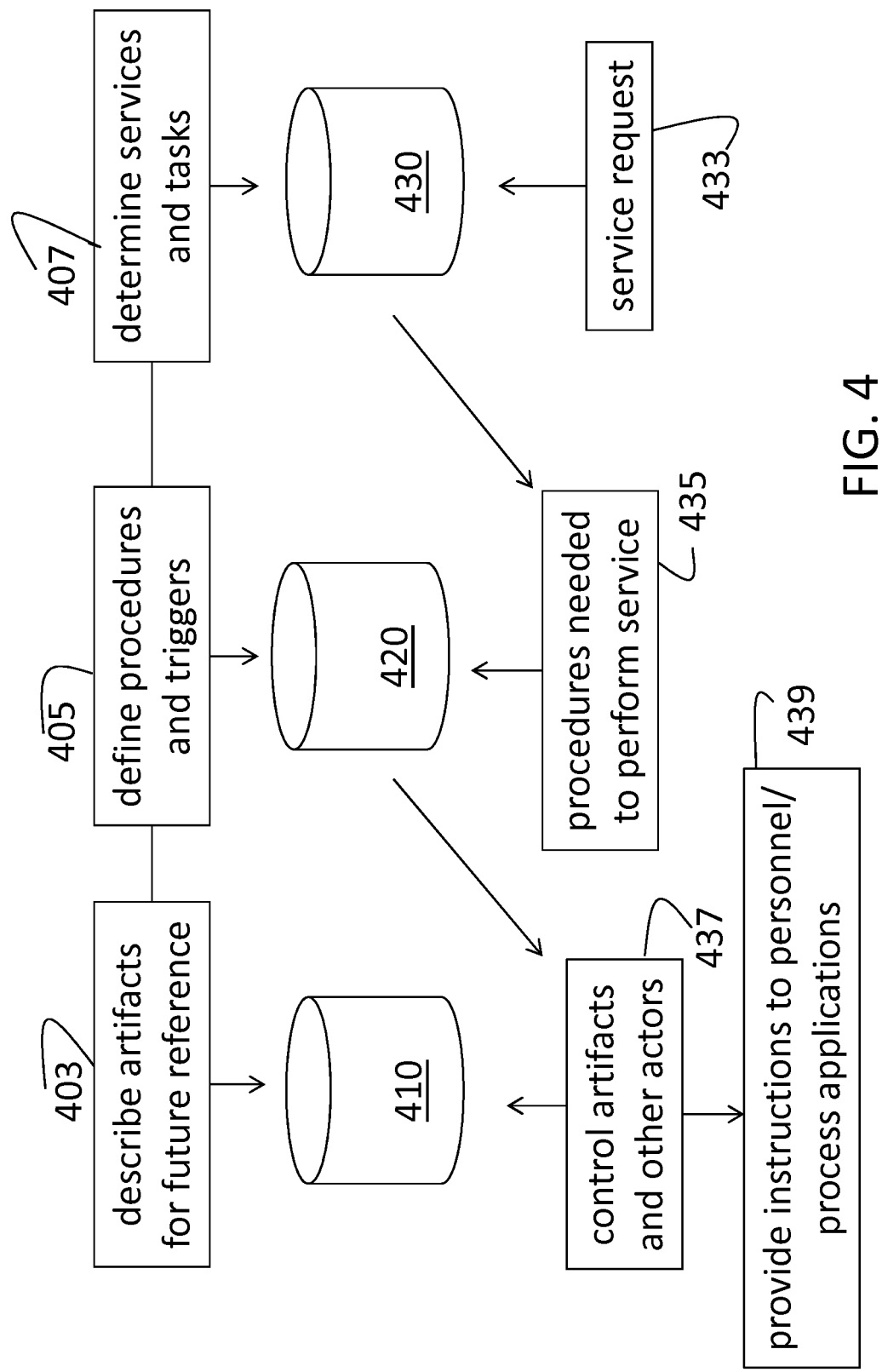
FIG. 4 is a functional flow diagram of an exemplary supervisory control system according to an embodiment of the invention.

FIG. 4 is a functional flow diagram of an exemplary supervisory control system 300 according to an embodiment of the invention. The supervisory control system 300 performs a series of functions, as shown, to prepare for and initiate delivery of a service. Artifacts (tools that are among the actors used to provide the service) must be described in a way that they can be referenced to complete procedures. Thus, based on describing artifacts (403), an artifact ontology repository 410 is created to call up a given artifact with its data and commands at run time. A function of defining procedures and triggers (405) is used to create a procedures repository 420. Exemplary triggers include a specified time, depth, or event. An event may be anticipated (e.g., entry into a reservoir or encounter of a formation disconformity) or unanticipated (e.g., vibration or encounter of a borehole shape). These procedures use the artifacts described in the artifact ontology repository 410. A function of defining services and associated tasks (407) is used to generate a services repository 430. Each service and associated tasks invoke procedures and the corresponding control of actors (including artifacts) as discussed below.

When a service request is received (433), the services repository 430 is used (e.g., by look-up) to determine the associated tasks and procedures that make up the tasks needed to perform the service are determined (435). These procedures and the associated triggers in the procedures repository 420 are used (e.g., by look-up) to control artifacts and other actors (437). The procedures invoked at 435 may be executed automatically (in a defined sequence), executed conditionally (e.g., based on a decision tree), or executed based on some other strategy. Based on the procedures looked up in the procedures repository 420, the artifact ontology repository 410 may be accessed to control one or more corresponding artifacts. Alternately or additionally, if other (non-artifact) actors are involved in carrying out the procedures, personnel may be provided with step-by-step instructions (i.e. output interface 340 includes a display or transmission) or an application may be processed (439). Data obtained from surface or downhole tools or sensors or actuators distributed along the drillstring 10, engineering or planning data, and best practices may be used in the decision making when procedures are executed conditionally (435), or used in the control of artifacts (437), or used in both.

Figure 5:
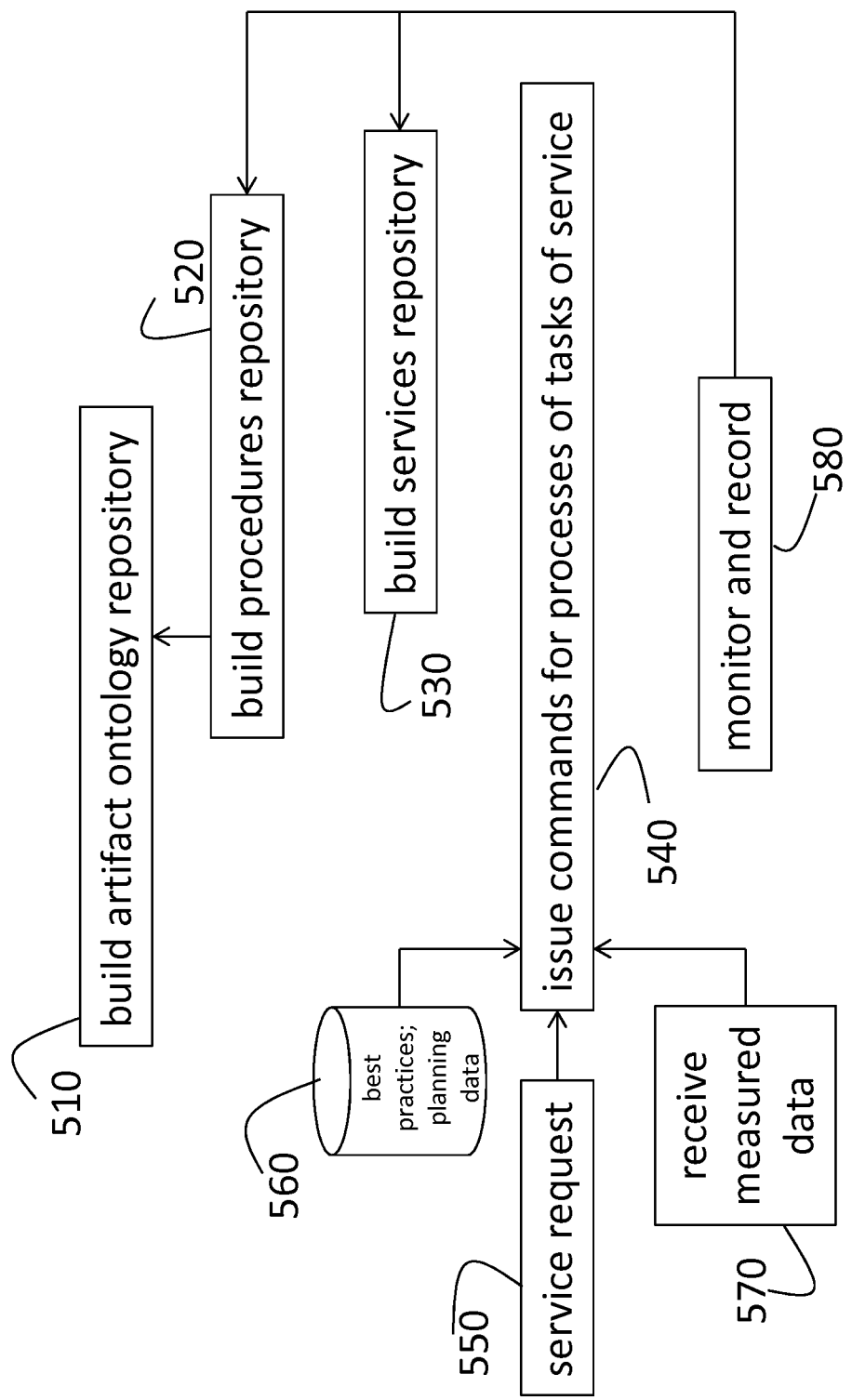
FIG. 5 is a process flow diagram of a method of providing a service downhole according to embodiments of the invention.

FIG. 5 is a process flow diagram of a method of providing a service downhole according to embodiments of the invention. While the service may be provided downhole, both surface and downhole sensors and actors may be used in the processes executed to provide the service. Building the artifact ontology repository 410, at block 510, building the procedures repository 420, at block 520, and building the services repository 430, at block 530, are performed as discussed above with reference to FIG. 4. When a service request is sent (block 550), the supervisory control system 300 uses several sources of information before issuing commands for processes of tasks corresponding to the requested service. The commands may be one or a combination of information or instructions for a human operator or instructions to control tools or applications based on the mode of operation (manual, semi-autonomous, autonomous). The supervisory control system 300 accesses the services repository 430 to determine (e.g., look up) the tasks associated with the service. The supervisory control system 300 then accesses the procedures repository 420 to determine (e.g., look up) the triggers and other information associated with the procedures corresponding to the tasks associated with the requested service. The artifact ontology repository 410 indicates to the supervisory control system 300 how a particular command directed to a given artifact may need to be structured. Additional information may then be used by the supervisory control system 300 to modify or add to the commands resulting from the repository information (e.g., a trigger of a procedure may be modified based on additional information). Among the information that may affect the commands is sensor data from sensors (e.g., tools 10) downhole or at the surface based on receiving measured data at block 570. Best practices and engineering or planning data may also be accessed at 560. The information may be used in a decision tree executed by the processor 320 of the supervisory control system 300, for example, and may affect the selection of the procedures that are ultimately executed or the triggers for those procedures. Monitoring and recording at block 580 includes the supervisory control system 300 monitoring the progress of a process that has been initiated to determine what, if any, modifications may be needed in subsequent commands. The monitoring and recording allows the supervisory control system 300 to modify tasks and procedures in the services repository 430 and procedures repository 420 based on real world feedback.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A system to provide a drilling service, the service corresponding with a goal, the system comprising:
    a processor configured to identify two or more tasks associated with the service and one or more procedures associated with each of the one or more tasks; and
    an output interface configured to output commands to complete the one or more procedures associated with each of the two or more tasks based on an occurrence of corresponding one or more trigger conditions, the commands being directed to actors that complete the one or more procedures, the actors including a downhole tool, a surface tool, or a human operator, wherein the one or more trigger conditions include an encounter of a borehole shape, and the processor is further configured to prioritize two or more of the two or more tasks that involve a same actor among the actors.

2. The system according to claim 1, wherein the processor is configured to identify the one or more procedures associated with each of the two or more tasks based on a look-up table.

3. The system according to claim 1, further comprising an input interface configured to receive sensor data, wherein the processor is configured to identify the one or more procedures associated with at least one of the two or more tasks based on the sensor data.

4. The system according to claim 1, further comprising a storage device configured to store information associated with best practices, wherein the processor is configured to identify the one or more procedures associated with at least one of the two or more tasks based on the information.

5. The system according to claim 1, when the actors include the human operator, the commands include step-by-step instructions output to a display.

6. The system according to claim 1, wherein, in an autonomous mode, the commands directed to the actors are processed automatically.

7. The system according to claim 1, wherein, in a manual mode, the commands directed to the acors are output as information to an operator.

8. The system according to claim 1, wherein, in a semi-autonomous mode, the commands directed to the actors are output as instructions to an operator.

9. A method of providing a drilling service, the service corresponding with a goal, the method comprising:
    identifying, using a processor, two or more tasks required to provide the service;
    identifying one or more procedures associated with completing each of the two or more tasks; and
    outputting commands to complete the one or more procedures associated with each of the two or more tasks upon occurrence of corresponding one or more trigger conditions, the commands being directed to actors that complete the one or more procedures, the actors including a downhole tool, a surface tool, or a human operator, wherein the one or more trigger conditions include an encounter of a borehole shape, and the outputting the commands includes prioritizing two or more of the two or more tasks that involve a same actor among the actors.

10. The method according to claim 9, wherein the identifying the one or more procedures associated with each of the two or more tasks includes using a look-up table.

11. The method according to claim 9, further comprising receiving sensor data, wherein the identifying the one or more procedures associated with each of the two or more tasks is based on the sensor data.

12. The method according to claim 9, further comprising storing information associated with best practices, wherein the identifying the one or more procedures associated with each of the two or more tasks is based on the information.

13. The method according to claim 9, further comprising automatically processing the commands directed to the actors when an operating mode is an autonomous mode.

14. The method according to claim 9, further comprising outputting the commands directed to the actors as information to the human operator when an operating mode is a manual mode.

15. The method according to claim 9, further comprising outputting the commands directed to the actors as instructions to the human operator when an operating mode is a semi-autonomous mode.

16. A method of providing a drilling service, the service corresponding with a goal, the method comprising:
    identifying, using a processor, two or more tasks required to provide the service based on selecting the two or more tasks from among a plurality of tasks in a look-up table;
    identifying one or more procedures associated with completing each of the two or more tasks; and
    outputting commands to complete the one or more procedures associated with each of the two or more tasks upon occurrence of corresponding one or more trigger conditions, the commands being directed to actors that complete the one or more procedures, the actors including a downhole tool, a surface tool, or a human operator, wherein the one or more trigger conditions include an encounter of a borehole shape.

17. The method according to claim 16, further comprising automatically processing the commands directed to the actors when an operating mode is an autonomous mode.

18. The method according to claim 16, further comprising outputting the commands directed to the actors as information to the human operator when an operating mode is a manual mode.

19. The method according to claim 16, further comprising outputting the commands directed to the actors as instructions to the human operator when an operating mode is a semi-autonomous mode.

* * * * *